(12) United States Patent
Martin

(10) Patent No.: US 6,572,971 B2
(45) Date of Patent: Jun. 3, 2003

(54) STRUCTURAL MODIFIED EPOXY ADHESIVE COMPOSITIONS

(75) Inventor: Laura Lee Martin, Hilliard, OH (US)

(73) Assignee: Ashland Chemical, Columbus, OH (US)

( * ) Notice: Subject to any disclaimer, the term of this patent is extended or adjusted under 35 U.S.C. 154(b) by 0 days.

(21) Appl. No.: 09/793,070

(22) Filed: Feb. 26, 2001

(65) Prior Publication Data

US 2002/0164485 A1 Nov. 7, 2002

(51) Int. Cl.[7] .................. B32B 27/38; B32B 27/04; C08L 63/00
(52) U.S. Cl. .............. 428/414; 428/413; 428/416; 428/418; 428/521; 428/522; 428/523; 428/297.4; 525/107; 525/113; 525/523; 525/524; 525/529
(58) Field of Search ................ 523/435, 457, 523/458, 455; 428/413, 416, 414, 297.4, 418, 521, 522, 523; 525/523, 524, 529, 107, 113

(56) References Cited

U.S. PATENT DOCUMENTS 4,180,166 A  *  12/1979  Batdorf .................. 206/568
5,336,703 A  *  8/1994  Homma et al. ............ 523/435
6,337,463 B1  *  1/2002  Gaku et al. ............ 219/121.61

* cited by examiner

Primary Examiner—Robert Dawson
Assistant Examiner—Michael J Feely
(74) Attorney, Agent, or Firm—Mueller and Smith, LPA

(57) ABSTRACT

The present invention is directed to an adhesive composition, which comprises an epoxy resin, a coupling agent, filler, and an effective amount of an amine-curing agent or curative for said epoxy resin. Advantageously, tri-functional and/or tetrafunctional epoxy resins and/or acrylate monomers will be incorporated into the adhesive composition in order to reduce open time and enhance substrate adhesion. Advantageously, a mixture of amines will be used in the curative including aliphatic amines, which have low viscosities and efficiently wet the substrate for enhancing adhesion; polyamines, which can be used to manipulate open time and allow for improved ratio tolerance of the adhesive system; and amine-terminated rubbers (ATBN), which can improve impact resistance and the toughness of the cured adhesive. Preferred coupling agents are silanes.

56 Claims, No Drawings

STRUCTURAL MODIFIED EPOXY ADHESIVE COMPOSITIONS

BACKGROUND OF THE INVENTION

The present invention relates to structural engineering adhesives for bonding metal and fiber-reinforced composite parts (e.g. sheet molding compounds (SMC), fiberglass reinforced polyesters (FRP), structural reaction injected molded (SRIM), resin transfer moldings (RTM), and the like) to a variety of similar and dissimilar substrates, which find use in the manufacture of cars, trucks, boats, and a host of other products.

Sheet molding compound (SMC), for example, is defined (ASTM) as a molding compound in integral sheet form comprising a thermosetting resin, fibrous reinforcement, and additives required for processing or product performance, e.g., resin, catalyst, thickener, mold release agent, particulate filler, pigment, shrink control agent, etc. These materials and others generally are known as fiber-reinforced composites, reinforced composites, or simply composites. Metal may include, but not be limited to, hot dipped galvanized steel, electrogalvanized steel, e-coat steel, cold rolled steel, bare aluminum, anodized aluminum, etched aluminum, magnesium, etc.

One typical class of structural adhesives useful in adhering composite parts to the same and to different substrates is two-part polyurethane adhesives. Combining a prepolymer and a curative just before use makes these materials useful as adhesives. The ratio in which these materials are combined will vary depending upon the functionality of the prepolymer and the curative. Accurate combination of the materials requires a certain skill level of the worker and, unfortunately, there is substantial waste of adhesive during the mixing process even when using automatic pumping equipment. In addition, polyurethane adhesives generally have poor thermal properties and are not conducive to applications requiring high temperature ovens.

Another common class of structural adhesives useful in adhering metal parts to the same and to different substrates (e.g. composites) is epoxy adhesives. Epoxy adhesive compositions most often contain a polyfunctional epoxy resin and are cured by addition of a curative, which typically is provided in a separate package. The rate of cure and product characteristics are influenced by the choice of curing agent, which itself is influenced by the make-up of the adhesive composition, as dictated by the final properties desired by the user.

Structural adhesives are used by application to the surface of a part made of, e.g. metal, and positioning a surface of second part (of the same or different material) over the adhesive covered metal covered surface. Since the parts often have uneven surfaces, it is desirable that the adhesive possess the ability to fill the resulting voids of varying depth. It is important that the adhesive remain uncured and fluid for sufficient time to permit placing of the second substrate into contact with the adhesive. An adhesive, which hardens too quickly, does not permit flexibility in the assembly line process. Thus, the length of time the adhesive is fluid is measured and is referred to as "open time". The adhesive may be cured by placing the adhered parts in an oven maintained at, e.g., 70°–190° C. for, e.g., 5 minutes or less to cure or harden the adhesive, or the adhesive may be cured by letting it stand at room temperature for one to several days, e.g., 3 days.

Representative epoxy structural adhesive compositions can be found in, for example, U.S. Pat. Nos. 5,385,990, 4,921,912, 4,661,539, 4,740,539, and 4,707,518, the disclosures of which are expressly incorporated herein by reference. Various combinations of epoxy resins, rubber modifiers, amine curing agents, amide curing agents, Lewis acids, mercaptan curing agents, etc. have been proposed for formulating high strength adhesive compositions. A major deficiency in these adhesives is that they often suffer from poor and/or limited adhesion, especially to SMC, SRIM, vinyl ester SMC, and other substrates. These same adhesives also require post-baking in order to obtain full cure and properties.

BROAD STATEMENT OF THE INVENTION

Broadly, the present invention embodies an adhesive composition, which comprises an epoxy resin, a coupling agent, filler, and an effective amount of an amine-curing agent or curative for said epoxy resin. Advantageously, tri-functional and/or tetrafunctional epoxy resins and/or acrylate monomers will be incorporated into the adhesive composition in order to reduce open time and enhance substrate adhesion. Advantageously, a mixture of amines will be used in the curative including aliphatic amines, which have low viscosities and efficiently wet the substrate for enhancing adhesion; polyamines, which can be used to manipulate open time and allow for improved ratio tolerance of the adhesive system; and amine-terminated rubbers (ATBN), which can improve impact resistance and the toughness of the cured adhesive. Preferred coupling agents are silanes. In addition, dicyandiamide may be incorporated in the amine side to react with any residual epoxy resin that may be present.

Advantages of the present invention include an adhesive composition, which does not need any post-baking to obtain full cure. Another advantage is excellent adhesion that the inventive adhesive composition retains without post-baking. These and other advantages will be readily apparent to those skilled in the art based upon the disclosure contained herein.

DETAILED DESCRIPTION OF THE INVENTION

Conventional two-component epoxy adhesives are extensively used in the automotive industry to bond SMC, SRIM (structural reaction injected molding), and other substrates. However, many of these epoxy systems, particularly polyamide-based systems, have undesirably long open times and require post-baking in order to achieve full cure of the adhesive composition. The inventive adhesive composition overcomes such problems by incorporation of a coupling agent with the epoxy resin and by using aliphatic amines as part of the curative.

Referring initially to the epoxy resin, a variety of monomeric and polymeric compounds or mixtures of compounds having an epoxy equivalency equal to or greater than 1 (i.e., wherein the average number of epoxy groups per molecule is 1 or more) can be used in formulating the inventive adhesives. Epoxy compounds are well-known as the art cited above details and which is expressly incorporated herein by reference. Useful epoxy compounds include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl)propane; polyglycidyl ethers of aliphatic and aromatic polycarboxylic acids, such as, for example, oxalic acid, succinic acid, glutaric acid, terephthalic acid, 2,6-napthalene dicarboxylic acid, and dimerized linoleic acid; polyglycidyl ethers of polyphenols, such as, for example, bis-phenol A, bis-phenol F, 1,1-bis(4-hydroxyphenyl)ethane, 1,1-bis(4-hydroxyphenyl)isobutane, and 1,5-dihydroxy napthalene; modified epoxy resins with acrylate or urethane moieties; glycidlyamine epoxy resins; and novolak resins; and the like and mixtures thereof.

The foregoing epoxy resins may be augmented with modified epoxy resins in the form of epoxy-rubber adducts. Such adducts are well known and include epoxy compounds reacted with liquid or solid butadiene-(meth)acrylonitrile copolymers having at least two groups which are reactive with epoxy groups, including, for example, carboxyl, hydroxyl, mercapto, and amino. Such functional elastomeric copolymers having functional groups are well-known articles of commerce and need not be discussed in greater detail herein. It should be recognized additionally, that such rubber compounds also can be added to the curative pack of the two-pack structural adhesive of the present invention. Thus, the rubber modifier can be used neat or adducted with, for example, an epoxy; and included in one or more of the resin pack or the curative pack of the inventive adhesive composition. A preferred rubber is an amine terminated butadieneacrylonitrile rubber, which may be present in an amount ranging up to about 65 wt-% and advantageously between about 30 and 50 wt-%.

Referring now to adhesion promoters, such promoters include the reaction product of an omega-aminoalkyl trialkoxy silane with a glycidyl ether or polyglycidyl ether. Typical trialkoxy silane linkages include —Si(OCH$_3$)$_3$ and —Si(OCH$_2$CH$_3$)$_3$, which are capable of hydrolyzing to Si(OH)$_3$. Suitable epoxy functional silane compounds include, for example, gamma-glycidoxypropyltrimethoxysilane and beta-(3,4-epoxycyclohexyl)ethyltrimethoxy silane. In addition, organo-silanes containing moieties, such as, for example, ester, vinyl, methacryloxy, sulfur, amino, ureido, isocyanurate, and isocyanato groups may be used. The silane ingredient can range up to about 10 wt-% and advantageously ranges from about 0.25 to 2 wt-% in the adhesive composition.

Acrylate monomers may be incorporated in the aforementioned epoxy resins to further adjust open time and improve adhesion, in particular, to metal substrates. Acrylate monomers may be used solely or as a mixture of two or more monomers. Suitable acrylate monomers include, for example, monofunctional, difunctional, tri-functional, and tetrafunctional acrylates. A representative listing of these monomers includes alkyl acrylates, hydroxyalkyl acrylates, alkoxyalkyl acrylates, acrylated epoxy resins, cyanoalkly acrylates, alkyl methacrylates, hydroxyalkyl methacrylates, alkoxyalkyl methacrylates, cyanoalkyl methacrylates, N-alkoxymethacrylamides, N-alkoxymethylmethacrylamides, and difunctional monomer acrylates. Other acrylates which can be used include trimethylolpropane triacrylate, trimethylolpropane trimethacrylate, zinc diacrylate, 2-ethylhexyl methacrylate, pentaerythritol triacrylate and pentaerythritol tetraacrylate. The foregoing list is merely illustrative and not limitative of the present invention.

Referring now to the amine-based curing agents, such curing agents include aliphatic amines, polyamines, polyamidoamines, alicyclic polyamines, tertiary amines, and various mixtures thereof. Suitable aliphatic amines and polyamines include, but are not limited to, ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, tris(dimethyl) aminoethylphenol, dimethylaminomethylphenol, dicyandiamide, diaminodiphenylsulfone, bis(aminopropyl) piperazine, and N-aminoethylpiperazine. Suitable aliphatic polyamines include resins, which are modified, for example, by condensation with tall oil fatty acids. Furthermore, Mannich bases and aromatic polyamines, such as, for example, xylenediamine, may be used as amine hardeners. The aliphatic amine should be present in an amount of between about 1 and 65 wt-% and advantageously between about 1 and 35 wt-%. The polyamine should be present in an amount of between about 1 and 65 wt-% and advantageously between about 1 and 35 wt-%.

In order to obtain high flexibility, toughness and improved water stability, amidoamines or polyamides may be used. Amidoamines can contain flexible groups, in particular the dimerized linoleic acid backbone. These materials may be obtained from commercials sources, i.e., Versamid 140 (the reaction product of dimerized linoleic acid with aliphatic primary amines, Henkel). Furthermore, to enhance the rates of curing, flexibility and toughness, polyphenolics such as bisphenol-A can also be included in the hardener component. The active hydrogen equivalent weight of the hardener can by varied by adding different levels of poly(alkylene ether) diamine. This also helps to improve the flexibility and adhesion of the adhesive. The amount (ratio) of amidoamine:bisphenol-A may be in the range of 30 to 90:8 to 35:2 to 35 weight percent.

Optional ingredients in the adhesive composition include, for example particulate and reinforcing fillers and thixotropic agents, tinctorial pigments, opacifying pigments (e.g., TiO$_2$), and like conventional additives. Fillers are utilized in the adhesive to help maintain viscosity, improve sag resistance, and provide reinforcement to the final cured material, as well as reduce the final cost of the product. Useful fillers include, for example, Kevlar®, kaolin, talc, mica, clay, calcium carbonate, any of the alkaline earth inorganic salts, metals such as powdered aluminum or iron, metal oxides such as ferric oxide or aluminum oxide, silica, ceramic beads such as those available under the trademark Zeeospheres from Zeelan Industries, Inc., or any other filler (and mixtures thereof) well-known to those skilled in the art of formulating adhesives.

The adhesive of the present invention is particularly well adapted for use on a variety of fiber-reinforced composites, including, for example, sheet molding compound (SMC), structural reaction injected molded (SRIM), vinyl ester SMC, and E-coat metal substrates. Among the fiberglass reinforced polyester substrates useful in the practice of this invention are those provided by Ashland Specialty Chemical, Dublin, Ohio (Phase β, Phase δ, Phase ε), GenCorp, Marion, Ind. (GC-7113, GC-8002 and GC-7101 substrates), Rockwell International Corporation, Centralia, Ill. (RW 9468 Substrate), Budd Company, Madison Heights, Mich. (DSM 950 and DSM 951 Substrate), and Eagle Picher Plastics, Grabill, Ind. (EP SLI-213 Substrate). The SRIM substrates useful in the practice include those provided by Bayer, Pittsburgh, Pa. (Baydur 425 HD-SRIM). Typical vinyl ester SMC substrates are manufactured by Dow, Midland, Mich. (Derakane 790). Car and truck body parts made of sheet molding compound (SMC) also are adhered using structural urethane adhesives and can now be adhered using the two-part epoxy adhesive of this invention.

The inventive adhesive is adaptable for use on a variety of other plastics such as reaction injection molding (RIM) polyurethanes, acrylonitrile-butadiene-styrene (ABS)

terpolymers, styrene acrylonitrile copolymers (SAN), nylon, thermoplastic polyolefins (TPO), and thermoplastic alloys such as, for example, polycarbonate-polyester blends and polycarbonate-ABS blends. Among the useful fibers used in reinforcing the substrates are fiberglass, graphite, and polymeric fibers, e.g., polyamide fiber. The inventive adhesive further can be used to adhere SMC to metal, optionally primed, for example, with electrodeposited (ELPO) primers.

The adhesive composition is formulated by simple blending, often under high shear conditions, of the ingredients. For SMC uses, the adhesive composition preferably is applied robotically by extrusion through a follower plate, though it may be applied by conventional roller coating, both direct and indirect, spray application, dip application, or any application technique that is necessary, desirable, or convenient. No priming of the composite or metal substrate is required when using the inventive adhesive. The parts then are joined under pressure at ambient temperature or, optionally, elevated temperatures (i.e., greater than 82° C.) to facilitate cure.

While the invention has been described and illustrated in connection with certain preferred embodiments thereof, it will be apparent to those skilled in the art that the invention is not limited thereto. Accordingly, it is intended that the appended claims cover all modifications, which are within the spirit and scope of this invention. All references cited herein are expressly incorporated herein by reference.

The following examples show how the invention has been practiced, but should not be construed as limiting. In this application, all percentages and proportions are by weight and all units are in the metric system, unless otherwise expressly indicated.

EXAMPLES

Example 1

Three adhesive formulations were compounded from ingredients set forth below in Table 1. These adhesives were used to bond various automotive substrates. Bonded SRIM, RRIM, and SMC were heat-fixtured and optionally post-baked at 180° F. or 20 min or 300° F. for 30 min. Bonded hot dipped galvanized steel (HDG), electrogalvanized steel (EG) and bare steel assemblies were post-baked at 375° F. for 20 min without a fixture cure. Lap shear adhesion tests (ASTM method D1002) were run at a tensile speed of 0.5 in/min.

TABLE 1

| INGREDIENT* | ADHESIVE 1 (wt-%) | ADHESIVE 2 (wt-%) | ADHESIVE 3 (wt-%) |
|---|---|---|---|
| Epoxy Side | | | |
| Aralidite GY 2600[1] | 93.73 | 58.54 | 83.59 |
| Epon 8121[2] | — | — | 10.12 |
| Silquest A-186[3] | 0.75 | 0.25 | 0.75 |
| Cab-O-Sil TS720[4] | 5.52 | 2.00 | 5.54 |
| Winnofil SPM[5] | — | 24.94 | — |
| Mistron RCS Talc[6] | — | 14.27 | — |
| Curative Side | | | |
| Vestamin TMD[7] | 29.03 | — | 29.03 |
| Epicure 3273[8] | 29.03 | — | 29.03 |
| Dytek-A[9] | — | 40.13 | — |
| Amicure CG1400[10] | — | 10.03 | — |
| ATBN 1300x42[11] | — | 7.77 | — |
| Cab-O-Sil TS720[4] | 5.62 | 5.64 | 5.62 |
| Winnofil SPM[5] | 17.83 | 17.88 | 17.83 |

TABLE 1-continued

| INGREDIENT* | ADHESIVE 1 (wt-%) | ADHESIVE 2 (wt-%) | ADHESIVE 3 (wt-%) |
|---|---|---|---|
| Molecular Sieves, 5Å[12] | — | 7.95 | 7.92 |
| Mistron RCS Talc[6] | — | 10.60 | 10.57 |

[1]Araldite GY2600 epoxy resin, 184 to 188 epoxide equivalent weight, 11,000 to 14,000 cPs at 25° C., Ciba Specialty Chemicals.
[2]Epon 8121 epoxy resin, 300–325 weight per epoxide, 130 equivalent weight, 2,700 to 3,700 cPs at 25° C., Shell Chemical Company.
[3]Silquest A-186 is 3-glycidyloxypropyl-trimethoxy silane, 264 molecular weight, 5 cSt at 25° C., Witco Corporation.
[4]Cab-O-Sil TS720 is hydrophobic fumed silica, Cabot Corp.
[5]Winnofil SPM is fatty acid coated precipitated calcium carbonate, Zeneca Resins.
[6]Mistron RCS Talc is hydrous magnesium silicate, Cyprus Industrial Minerals Company.
[7]Vestamin TMD is trimethylhexamethylenediamine, 79 amine equivalent weight, 40 amine hydrogen equivalent weight, Creanova, Incorporated.
[8]Epicure 3273 is a modified aliphatic amine, 420–480 amine value, 1,200 to 2,000 cPs at 25° C., Shell Chemical Company.
[9]Dytek-A is 2-methylpentamethylenediamine, 116 molecular weight, 58 amine equivalent weight, 29 amine hydrogen equivalent weight, 2.63 cPs at 25° C., Dupont Nylon.
[10]Amicure CG-1400 is Dicyandiamide.
[11]ATBN 1300x42 is amine terminated butadieneacrylonitrile rubber, 375 to 525 amine equivalent weight, 75,000 to 125,000 cPs at 27° C.
[12]Molecular sieves are 5Å zeolite (sodium/calcium aluminosilicate), UOP.

The following results were recorded:

TABLE 2

| TEST TYPE | ADHESIVE 1 | ADHESIVE 2 | ADHESIVE 3 |
|---|---|---|---|
| SRIM/SRIM-RT Test | 1,000 psi 100% fiber tear | — | 1,100 psi 100% fiber tear |
| SRIM/SRIM-180° F. Test | 1,000 psi 100% fiber tear | — | 1,100 psi 100% fiber tear |
| SRIM/E-Coat CD 952-RT Test | 1,500 psi 100% fiber tear | — | 1,500 psi 100% fiber tear |
| SRIM/E-Coat CD 952-180° F. Test | 1,500 psi 100% fiber tear | — | 2,100 psi 100% fiber tear |
| RRIM-RRIM-RT Test | 100% Substrate Failure (necking) | — | — |
| Phase β/Phase β-RT Test | — | 100% stock breaks | 100% stock breaks |
| Phase β/Phase β-180° F. Test | — | 100% stock breaks | — |
| SLI 213/SLI 213-RT Test | — | 500 psi 100% fiber tear | — |
| SLI 213/SLI 213-180° F. Test | — | 500 psi 100% fiber tear | — |
| HDG/HDG-RT Test | — | — | 2,000 psi 100% cohesive failure |
| HDG/HDG-180° F. Test | — | — | 2,000 psi 100% cohesive failure |
| EG/EG-RT Test | — | — | 2,000 psi 100% cohesive failure |
| EG/EG-180° F. Test | — | — | 2,000 psi 100% cohesive failure |
| Bare Steel/Bare Steel-RT Test | — | — | 3,000 psi 100% cohesive failure |
| Bare Steel/Bare Steel-180° F. Test | — | — | 3,000 psi 100% cohesive failure |

Example 2

Three adhesive formulations were compounded from ingredients set forth below in Table 3. These adhesives were used to bond automotive SRIM and/or e-coat metal and were heat-fixtured at 260° F./180° F. for 2 min and optionally post-baked at 180° F. or 20 min. Lap shear adhesion tests (ASTM method D1002) were run at a tensile speed of 0.5 in/min. Table 4 illustrates the necessity of incorporating a coupling agent into the epoxy adhesive.

TABLE 3

| INGREDIENT* | ADHESIVE 4 (wt-%) | ADHESIVE 5 (wt-%) | ADHESIVE 6 (wt-%) |
|---|---|---|---|
| Epoxy Side | | | |
| Aralidite GY 2600[1] | 95.00 | 95.00 | 94.29 |
| Silquest A-186[2] | — | 0.50 | 0.74 |
| Cab-O-Sil TS720[3] | 5.00 | 4.50 | 4.96 |
| Curative Side | | | |
| Vestamin TMD[4] | 29.03 | 29.03 | 29.03 |
| Epicure 3273[5] | 29.03 | 29.03 | 29.03 |
| Cab-O-Sil TS720[3] | 5.62 | 5.62 | 5.62 |
| Winnofil SPM[6] | 17.83 | 17.83 | 17.83 |
| Molecular Sieves, 5Å[7] | 7.92 | 7.92 | 7.92 |
| Mistron RCS Talc[8] | 10.57 | 10.57 | 10.57 |

[1]Araldite GY2600 epoxy resin, 184 to 188 epoxide equivalent weight, 11,000 to 14,000 cPs at 25° C., Ciba Specialty Chemicals.
[2]Silquest A-186 is 3-glycidyloxypropyl-trimethoxy silane, 264 molecular weight, 5 cSt at 25° C., Witco Corporation.
[3]Cab-O-Sil TS720 is hydrophobic fumed silica, Cabot Corp.
[4]Vestamin TMD is trimethylhexamethylenediamine, 79 amine equivalent weight, 40 amine hydrogen equivalent weight, Creanova, Incorporated.
[5]Epicure 3273 is a modified aliphatic amine, 420–480 amine value, 1,200 to 2,000 cPs at 25° C., Shell Chemical Company.
[6]Winnofil SPM is fatty acid coated precipitated calcium carbonate, Zeneca Resins.
[7]Molecular sieves are 5Å zeolite (sodium/calcium aluminosilicate), UOP.
[8]Mistron RCS Talc is hydrous magnesium silicate, Cyprus Industrial Minerals Company.

TABLE 4

| TEST TYPE | ADHESIVE 4 | ADHESIVE 5 | ADHESIVE 6 |
|---|---|---|---|
| SRIM/SRIM 180° F. Test | 1,000 psi 100% fiber tear | 1,100 psi 100% fiber tear | 1,100 psi 100% fiber tear |
| SRIM/E-Coat CD 952 180° F. Test | 1,339 psi <10% FT | 1,414 psi 80% FT | 1,313 psi 98% FT |

Example 3

Three adhesive formulations were compounded from ingredients set forth below in Table 5. These adhesives were used to Phase β SMC. Bonded SMC parts were heat-fixtured at 275° F./275° F. for 2 min and post-baked at 300° F. for 30 min. Lap shear adhesion tests (ASTM method D1002) were run at a tensile speed of 0.5 in/min. Table 6 exemplifies the necessity of using a toughening agent within the epoxy adhesive to obtain good wedge performance.

TABLE 5

| INGREDIENT* | ADHESIVE 7 (wt-%) | ADHESIVE 8 (wt-%) | ADHESIVE 9 (wt-%) |
|---|---|---|---|
| Epoxy Side | | | |
| Aralidite GY 2600[1] | 93.73 | 93.73 | 93.73 |
| Silquest A-186[2] | 0.75 | 0.75 | 0.75 |
| Cab-O-Sil TS720[3] | 5.52 | 5.52 | 5.52 |
| Curative Side | | | |
| Vestamin TMD[4] | 10 | 32.5 | 15 |
| Epicure 3273[5] | 10 | 32.5 | 25 |
| ATBN 1300x42[6] | 45 | — | 25 |

TABLE 5-continued

| INGREDIENT* | ADHESIVE 7 (wt-%) | ADHESIVE 8 (wt-%) | ADHESIVE 9 (wt-%) |
|---|---|---|---|
| Cab-O-Sil TS720[3] | 4.67 | 4.67 | 4.67 |
| Winnofil SPM[7] | 14.89 | 14.89 | 14.89 |
| Molecular Sieves, 5Å[8] | 6.61 | 6.61 | 6.61 |
| Mistron RCS Talc[9] | 8.82 | 8.82 | 8.82 |

[1]Araldite GY2600 epoxy resin, 184 to 188 epoxide equivalent weight, 11,000 to 14,000 cPs at 25° C., Ciba Specialty Chemicals.
[2]Silquest A-186 is 3-glycidyloxypropyl-trimethoxy silane, 264 molecular weight, 5 cSt at 25° C., Witco Corporation.
[3]Cab-O-Sil TS720 is hydrophobic fumed silica, Cabot Corp.
[4]Vestamin TMD is trimethylhexamethylenediamine, 79 amine equivalent weight, 40 amine hydrogen equivalent weight, Creanova, Incorporated.
[5]Epicure 3273 is a modified aliphatic amine, 420–480 amine value, 1,200 to 2,000 cPs at 25° C., Shell Chemical Company.
[6]ATBN 1300x42 is amine terminated butadieneacrylonitrile rubber, 375 to 525 amine equivalent weight, 75,000 to 125,000 cPs at 27° C.
[7]Winnofil SPM is fatty acid coated precipitated calcium carbonate, Zeneca Resins.
[8]Molecular sieves are 5Å zeolite (sodium/calcium aluminosilicate), UOP.
[9]Mistron RCS Talc is hydrous magnesium silicate, Cyprus Industrial Minerals Company.

TABLE 6

| TEST TYPE | ADHESIVE 7 | ADHESIVE 8 | ADHESIVE 9 |
|---|---|---|---|
| Phase β/Phase β-RT Test | 434 psi 100% fiber tear | 482 psi 100% fiber tear | 419 psi 100% fiber tear |
| Phase β/Phase β-180° F. Test | 432 psi 100% fiber tear | 403 psi 100% fiber tear | 328 psi 100% fiber tear |
| Phase β Wedge-RT Test | 100% fiber tear | <5% fiber tear | <5% fiber tear |
| Open Time (50 g mass) | 150 min | 12 min | 20 min |

The above-tabulated data for adhesive formulations 1 through 9 establishes the usefulness of the invention. These epoxy formulations have excellent adhesion to a wide variety of substrates. Furthermore, these adhesives are adaptable to various processing environments (e.g., fixture temperatures and times, post-bake parameters, etc.). By adjusting the amounts of aliphatic and polyamine it is possible to fine tune the open times of the adhesives.

I claim:

1. A two-component adhesive composition, which comprises:
   (a) a resin pack comprising an epoxy resin and silane coupling agent;
   (b) curative pack comprising an aliphatic amine and a polyamine,
   wherein one or more of said resin pack or said curative pack includes a butadiene-(meth)acrylonitrile copolymer.

2. The adhesive composition of claim 1, wherein said epoxy resin is one or more of polyglycidyl ethers of polyhydric polyols; polyglycidyl ethers of aliphatic and aromatic polycarboxylic acids; polyglycidyl ethers of polyphenols; modified epoxy resins with acrylate or urethane moieties; glycidylamine epoxy resins; and novolak resins.

3. The adhesive composition of claim 2, wherein polyhydric polyol is one or more of ethylene glycol, triethylene glycol, 1,2-propylene glycol, 1,5-pentanediol, 1,2,6-hexanetriol, glycerol, and 2,2-bis(4-hydroxy cyclohexyl) propane; said aromatic polycarboxylic acid is one or more of oxalic acid, succinic acid, glutaric acid, terephthalic acid, 2,6-napthalene dicarboxylic acid, and dimerized linoleic acid; and said polyphenol is one or more of bis-phenol A, bis-phenol F, 1,1-bis(4-hydroxyphenyl)ethane, 1,1-bis(4-hydroxyphenyl)isobutane, and 1,5-dihydroxy napthalene.

4. The adhesive composition of claim 1, wherein said silane coupling agent comprises the reaction product of an omega-aminoalkyl trialkoxy silane with a glycidyl ether or polyglycidyl ether.

5. The adhesive composition of claim 4, wherein said silane coupling agent is one or more of gamma-glycidoxypropyltrimethoxysilane or beta-(3,4-epoxycyclohexyl)ethyltrimethoxy silane.

6. The adhesive composition of claim 1, wherein said silane coupling agent contains one or more of the moieties ester, vinyl, methacryloxy, sulfur, amino, ureido, isocyanurate, or isocyanato.

7. The adhesive composition of claim 1, wherein silane coupling agent is present in an amount ranging from about 0.025 to 10 wt %-by weight of said adhesive composition.

8. The adhesive composition of claim 1, wherein said butadiene-(meth)acrylonitrile copolymer comprises amine terminated butadiene acrylonitrile rubber.

9. The adhesive composition of claim 1, wherein said butadiene-(meth)acrylonitrile copolymer is present up to about 65 wt-% by weight of said adhesive composition.

10. The adhesive composition of claim 9, wherein said butadiene-(meth)acrylonitrile copolymer is present between about 30 and 50 wt-% by weight of said adhesive composition.

11. The adhesive composition of claim 1, wherein said curative pack includes one or more of ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, tris(dimethyl) aminoethylphenol, dimethylaminomethylphenol, dicyandiamide, diaminodiphenylsulfone, bis(aminopropyl) piperazine, N-aminoethylpiperazine, or xylenediamine.

12. The adhesive composition of claim 1, wherein said aliphatic amine and said polyamine each should be present independently in an amount ranging from between about 1 and 65 wt-% by weight of said adhesive composition.

13. The adhesive composition of claim 12, wherein said aliphatic amine and said polyamine each should be present independently in an amount ranging from between about 1 and 35 wt-% by weight of said adhesive composition.

14. The adhesive composition of claim 1, which additionally comprises one or more of particulate fillers, reinforcing fillers, thixotropic agents, tinctorial pigments, or opacifying pigments.

15. The adhesive composition of claim 14, wherein said fillers include one or more of kaolin, $TiO_2$, talc, mica, clay, calcium carbonate, an alkaline earth inorganic salt, powdered aluminum, powdered iron, ferric oxide, aluminum oxide, silica, or ceramic beads.

16. The adhesive composition of claim 1, wherein
said epoxy resin is one or more of: polyglycidyl ethers of polyhydric polyols, polyglycidyl ethers of aliphatic and aromatic polycarboxylic acids, polyglycidyl ethers of polyphenols, modified epoxy resins with acrylate or urethane moieties, glycidylamine epoxy resins, or novolak resins;
said silane coupling agent is one ore more of: gamma-glycidoxypropyltrimethoxysilane or beta-(3,4-epoxycyclohexyl)ethyltrimethoxy silane; said silane is present in an amount ranging from 0.025 to 10 wt % by weight of said adhesive composition;
and said resin pack further comprises one or more of: a monofunctional acrylate compound, a difunctional acrylate compound, a tri-functional acrylate compound, or a tetrafunctional acrylate compound.

17. A laminated product comprising at least two substrates stacked to form a layered structure, wherein said substrates are adhesively joined with the cured residue of an adhesive, said adhesive which comprises:
(a) a resin pack comprising an epoxy resin and silane coupling agent;
(b) curative pack comprising an aliphatic amine and a polyamine.

18. The laminated product of claim 17, which comprises a first fiber-reinforced polymeric composite laminated to a second fiber-reinforced polymeric composite or metal.

19. The laminated product of claim 18, wherein said first and second fiber-reinforced polymeric composite independently are one or more of sheet molding compound (SMC), structural reaction injected molded (SRIM), E-coat metal substrates, fiberglass reinforced polyester (FRP), reaction injection molding (RIM) polyurethanes, acrylonitrile-butadiene-styrene (ABS) terpolymers, styrene acrylonitrile copolymers (SAN), nylon, thermoplastic polyolefins (TPO), polycarbonate-polyester blends, or polycarbonate-ABS blends.

20. The laminated product of claim 19, which is reinforced with one or more of fiberglass, graphite, or polymeric fibers.

21. The laminated product of claim 17, wherein said epoxy resin is one or more of polyglycidyl ethers of polyhydric polyols; polyglycidyl ethers of aliphatic and aromatic polycarboxylic acids; polyglycidyl ethers of polyphenols; modified epoxy resins with acrylate or urethane moieties; glycidylamine epoxy resins; and novolak resins.

22. The laminated product of claim 21, wherein polyhydric polyol is one or more of ethylene glycol, triethylene glycol, 1,2-propylene glycol, 1,5-pentanediol, 1,2,6-hexanetriol, glycerol, and 2,2-bis(4-hydroxy cyclohexyl) propane; said aromatic polycarboxylic acid is one or more of oxalic acid, succinic acid, glutaric acid, terephthalic acid, 2,6-napthalene dicarboxylic acid, and dimerized linoleic acid; and said polyphenol is one or more of bis-phenol A, bis-phenol F, 1,1-bis(4-hydroxyphenyl)ethane, 1,1-bis(4-hydroxyphenyl)isobutane, and 1,5-dihydroxy napthalene.

23. The laminated product of claim 17, wherein said silane coupling agent comprises the reaction product of an omega-aminoalkyl trialkoxy silane with a glycidyl ether or polyglycidyl ether.

24. The laminated product of claim 23, wherein said silane coupling agent is one or more of gamma-glycidoxypropyltrimethoxysilane or beta-(3,4-epoxycyclohexyl)ethyltrimethoxy silane.

25. The laminated product of claim 17, wherein said silane coupling agent contains one or more of the moieties ester, vinyl, methacryloxy, sulfur, amino, ureido, isocyanurate, or isocyanato.

26. The laminated product of claim 17, wherein silane coupling agent is present in an amount ranging from about 0.025 to 10 wt %-by weight of said adhesive composition.

27. The laminated product of claim 17, wherein one or more of said resin pack or said curative pack includes a butadiene-(meth)acrylonitrile copolymer.

28. The laminated product of claim 27, wherein said butadiene-(meth)acrylonitrile copolymer comprises amine terminated butadiene acrylonitrile rubber.

29. The laminated product of claim 27, wherein said butadiene-(meth)acrylonitrile copolymer is present up to about 65 wt-% by weight of said adhesive composition.

30. The laminated product of claim 29, wherein said butadiene-(meth)acrylonitrile copolymer is present between about 30 and 50 wt-% by weight of said adhesive composition.

31. The laminated product of claim 17, wherein said resin pack additionally comprises a monofunctional, difunctional, tri-functional, or tetrafunctional acrylate compound.

32. The laminated product of claim 31, wherein said acrylate compound is one or more of an alkyl acrylate, a hydroxyalkyl acrylate, an alkoxyalkyl acrylate, an acrylated epoxy resin, a cyanoalklyl acrylate, an alkyl methacrylate, a hydroxyalkyl methacrylate, an alkoxyalkyl methacrylate, a cyanoalkyl methacrylate, an N-alkoxymethacrylamide, an N-alkoxymethylmethacrylamide, trimethyloipropane triacrylate, trimethylolpropane trimethacrylate, zinc diacrylate, 2-ethylhexyl methacrylate, pentaerythritol triacrylate, or pentaerythritol tetraacrylate.

33. The laminated product of claim 32, wherein said curative pack includes one or more of ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, tris(dimethyl) aminoethylphenol, dimethylaminomethylphenol, dicyandiamide, diaminodiphenylsulfone, bis(aminopropyl) piperazine, N-aminoethylpiperazine, or xylenediamine.

34. The laminated product of claim 17, wherein said aliphatic amine and said polyamine each should be present independently in an amount ranging from between about 1 and 65 wt-% by weight of said adhesive composition.

35. The laminated product of claim 34, wherein said aliphatic amine and said polyamine each should be present independently in an amount ranging from between about 1 and 35 wt-% by weight of said adhesive composition.

36. The laminated product of claim 17, which additionally comprises one or more of particulate fillers, reinforcing fillers, thixotropic agents, tinctorial pigments, or opacifying pigments.

37. The laminated product of claim 36, wherein said fillers include one or more of kaolin, $TiO_2$, talc, mica, clay, calcium carbonate, an alkaline earth inorganic salt, powdered aluminum, powdered iron, ferric oxide, aluminum oxide, silica, or ceramic beads.

38. The laminated product of claim 17, wherein
said epoxy resin is one or more of: polyglycidyl ethers of polyhydric polyols, polyglycidyl ethers of aliphatic and aromatic polycarboxylic acids, polyglycidyl ethers of polyphenols, modified epoxy resins with acrylate or urethane moieties, glycidylamine epoxy resins, or novolak resins;
said silane coupling agent is one ore more of: gamma-glycidoxypropyltrimethoxysilane or beta-(3,4-epoxycyclohexyl)ethyltrimethoxy silane; said silane is present in an amount ranging from 0.025 to 10 wt % by weight of said adhesive composition;
said resin pack further comprises one or more of: a monofunctional acrylate compound, a difunctional acrylate compound, a tri-functional acrylate compound, or a tetrafunctional acrylate compound;
and wherein one or more of said resin pack or said curative pack includes a butadiene-(meth)acrylonitrile copolymer.

39. A two-component adhesive composition, which comprises:
(a) a resin pack comprising an epoxy resin, a silane coupling agent, and one or more of a monofunctional acrylate compound, difunctional acrylate compound, tri-functional acrylate compound, or tetrafunctional acrylate compound; and (b) curative pack comprising an aliphatic amine and a polyamine.

40. The adhesive composition of claim 39, wherein said epoxy resin is one or more of polyglycidyl ethers of polyhydric polyols; polyglycidyl ethers of aliphatic and aromatic polycarboxylic acids; polyglycidyl ethers of polyphenols; modified epoxy resins with acrylate or urethane moieties; glycidlyamine epoxy resins; and novolak resins.

41. The adhesive composition of claim 40, wherein polyhydric polyol is one or more of ethylene glycol, triethylene glycol, 1,2-propylene glycol, 1,5-pentanediol, 1,2,6-hexanetriol, glycerol, and 2,2-bis(4-hydroxy cyclohexyl) propane; said aromatic polycarboxylic acid is one or more of oxalic acid, succinic acid, glutaric acid, terephthalic acid, 2,6-napthalene dicarboxylic acid, and dimerized linoleic acid; and said polyphenol is one ore more of bis-phenol A, bis-phenol F, 1,1-bis(4-hydroxyphenyl)ethane, 1,1-bis(4-hydroxyphenyl)isobutane, and 1,5-dihydroxy napthalene.

42. The adhesive composition of claim 39, wherein said silane coupling agent comprises the reaction product of an omega-aminoalkyl trialkoxy silane with a glycidyl ether or polyglycidyl ether.

43. The adhesive composition of claim 42, wherein said silane coupling agent is one or more of gamma-glycidoxypropyltrimethoxysilane or beta-(3,4-epoxycyclohexyl)ethyltrimethoxy silane.

44. The adhesive composition of claim 39, wherein said silane coupling agent contains one or more of the moieties ester, vinyl, methacryloxy, sulfur, amino, ureido, isocyanurate, or isocyanato.

45. The adhesive composition of claim 39, wherein silane coupling agent is present in an amount ranging from about 0.025 to 10 wt %-by weight of said adhesive composition.

46. The adhesive composition of claim 39, wherein one or more of said resin pack or said curative pack includes a butadiene-(meth)acrylonitrile copolymer.

47. The adhesive composition of claim 51, wherein said butadiene-(meth)acrylonitrile copolymer comprises amine terminated butadiene acrylonitrile rubber.

48. The adhesive composition of claim 51, wherein said butadiene-(meth)acrylonitrile copolymer is present up to about 65 wt-% by weight of said adhesive composition.

49. The adhesive composition of claim 48, wherein said butadiene-(meth)acrylonitrile copolymer is present between about 30 and 50 wt-% by weight of said adhesive composition.

50. The adhesive composition of claim 39, wherein said acrylate compound is one or more of an alkyl acrylate, a hydroxyalkyl acrylate, an alkoxyalkyl acrylate, an acrylated epoxy resin, a cyanoalkly acrylate, an alkyl methacrylate, a hydroxyalkyl methacrylate, an alkoxyalkyl methacrylate, a cyanoalkyl methacrylate, an N-alkoxymethacrylamide, an N-alkoxymethylmethacrylamide, trimethylolpropane triacrylate, trimethylolpropane trimethacrylate, zinc diacrylate, 2-ethylhexyl methacrylate, pentaerythritol triacrylate, or pentaerythritol tetraacrylate.

51. The adhesive composition of claim 39, wherein said curative pack includes one or more of ethylenediamine, diethylenetriamine, triethylenetetramine, tetraethylenepentamine, 2-methyl-1,5-pentanediamine, pentaethylenehexamine, hexamethylenediamine, trimethyl-1,6-hexanediamine, polyetherdiamine, diethylaminopropylamine, oleylamine, isophorone diamine, diethanolamine, triethanolamine, tris(dimethyl) aminoethylphenol, dimethylaminomethylphenol, dicyandiamide, diaminodiphenylsulfone, bis(aminopropyl) piperazine, N-aminoethylpiperazine, or xylenediamine.

52. The adhesive composition of claim 39, wherein said aliphatic amine and said polyamine each should be present independently in an amount ranging from between about 1 and 65 wt-% by weight of said adhesive composition.

53. The adhesive composition of claim 52, wherein said aliphatic amine and said polyamine each should be present independently in an amount ranging from between about 1 and 35 wt-% by weight of said adhesive composition.

54. The adhesive composition of claim 39, which additionally comprises one or more of particulate fillers, reinforcing fillers, thixotropic agents, tinctorial pigments, or opacifying pigments.

55. The adhesive composition of claim 54, wherein said fillers include one or more of kaolin, $TiO_2$, talc, mica, clay, calcium carbonate, an alkaline earth inorganic salt, powdered aluminum, powdered iron, ferric oxide, aluminum oxide, silica, or ceramic beads.

56. The adhesive composition of claim 39, wherein said epoxy resin is one or more of: polyglycidyl ethers of polyhydric polyols, polyglycidyl ethers of aliphatic and aromatic polycarboxylic acids, polyglycidyl ethers of polyphenols, modified epoxy resins with acrylate or urethane moieties, glycidylamine epoxy resins, or novolak resins;

said silane coupling agent is one ore more of: gamma-glycidoxypropyltrimethoxysilane or beta-(3,4-epoxycyclohexyl)ethyltrimethoxy silane; said silane is present in an amount ranging from 0.025 to 10 wt % by weight of said adhesive composition;

and wherein one or more of said resin pack or said curative pack includes a butadiene-(meth)acrylonitrile copolymer.

* * * * *